US007999950B1

(12) United States Patent
Cohen et al.

(10) Patent No.: US 7,999,950 B1
(45) Date of Patent: Aug. 16, 2011

(54) METHOD AND APPARATUS FOR PROVIDING BACKUP FONT SUPPORT FOR MISSING DEVICE GLYPHS

(75) Inventors: Marc Leslie Cohen, Austin, TX (US); Scott Thomas Jones, Austin, TX (US); Mark Wayne Vander Wiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,555

(22) Filed: Nov. 12, 1998

(51) Int. Cl.
*G06K 15/02* (2006.01)
*G06F 17/21* (2006.01)

(52) U.S. Cl. ........................................ 358/1.11; 715/269
(58) Field of Classification Search .................... 756/1.1, 756/1.11, 1.16, 1.13, 1.15, 1.17, 1.12, 1.14; 400/152; 345/467, 471; 358/470
See application file for complete search history.

(56) References Cited

U.S. PATENT DOCUMENTS

| | | | |
|---|---|---|---|
| 4,683,819 A | 8/1987 | Mikoshiba | 101/93 |
| 4,685,814 A | 8/1987 | Yamamoto et al. | 400/82 |
| 4,942,390 A | 7/1990 | Do et al. | 340/735 |
| 5,167,013 A * | 11/1992 | Hube et al. | 358/1.11 |
| 5,495,577 A | 2/1996 | Davis et al. | 395/144 |
| 5,533,174 A | 7/1996 | Flowers, Jr. et al. | 395/114 |
| 5,577,183 A | 11/1996 | Weyand | 395/114 |
| 5,689,724 A | 11/1997 | Morgan et al. | 395/805 |
| 5,706,364 A | 1/1998 | Kopec et al. | 382/159 |

FOREIGN PATENT DOCUMENTS

JP     269622     5/1992

OTHER PUBLICATIONS

International Business Machines; Automatic Determination of Binary Print Data Stream; Sep. 1989; IBM Technical Disclosure Bulletin; vol. 32, No. 4B.

* cited by examiner

*Primary Examiner* — Scott A Rogers
(74) *Attorney, Agent, or Firm* — Yee & Associates, P.C.

(57) ABSTRACT

The present invention provides a method and apparatus in a data processing system for printing characters. Data received includes glyphs for output on an output device, wherein the glyphs are to be output using a selected device font. Monitoring for unsupported glyphs in the selected device font is performed. In response to detecting a glyph unsupported by the selected device font, a back up system font is used to output the glyph to the output device.

5 Claims, 4 Drawing Sheets

METHOD AND APPARATUS FOR PROVIDING BACKUP FONT SUPPORT FOR MISSING DEVICE GLYPHS

BACKGROUND OF THE INVENTION

1. Technical Field

The present invention relates to the field of information handling systems and in particular to an improved data processing system for presenting information to a user. Still more particularly, the present invention relates to a method and apparatus for providing backup font support for missing device font glyphs.

2. Description of Related Art

During the creation of a print job, an application may use a variety of fonts and glyphs within the fonts to produce the desired text output on an output device, such as a printer or display device. A glyph is described as an image, usually an individual character within a font, or a graphic symbol whose appearance conveys information, such as, for example, the vertical and horizontal arrows on cursor keys that indicate the directions in which they control cursor movement. Typically, the application will select a code page, which defines the character encoding and the set of glyphs being used within the font. A code page is a standard character encoding that identifies a set of glyphs. The problem occurs when a font does not support all of the glyphs within a code page. In this instance, glyphs not present in the font are not printed.

More specifically, when new glyphs are created such as the recent introduction of the Euro Currency character, many hardware devices that contain device fonts can not be readily updated to add the new glyph support. In the case of printing devices, this creates a situation where the new glyphs will simply be missing or incorrectly printed. One presently available method for printing missing glyphs involves turning off device fonts and using system fonts. A disadvantage with this method is that the amount of data downloaded to the printer increases by orders of magnitude, reducing efficiency in printing documents. Therefore, it would be advantageous to have an improved method and apparatus for outputting glyphs.

SUMMARY OF THE INVENTION

The present invention provides a method and apparatus in a data processing system for printing characters. Data received includes glyphs for output on an output device, wherein the glyphs are to be output using a selected device font. Monitoring for unsupported glyphs in the selected device font is performed. In response to detecting a glyph unsupported by the selected device font, a backup system font is used to output the glyph to the output device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
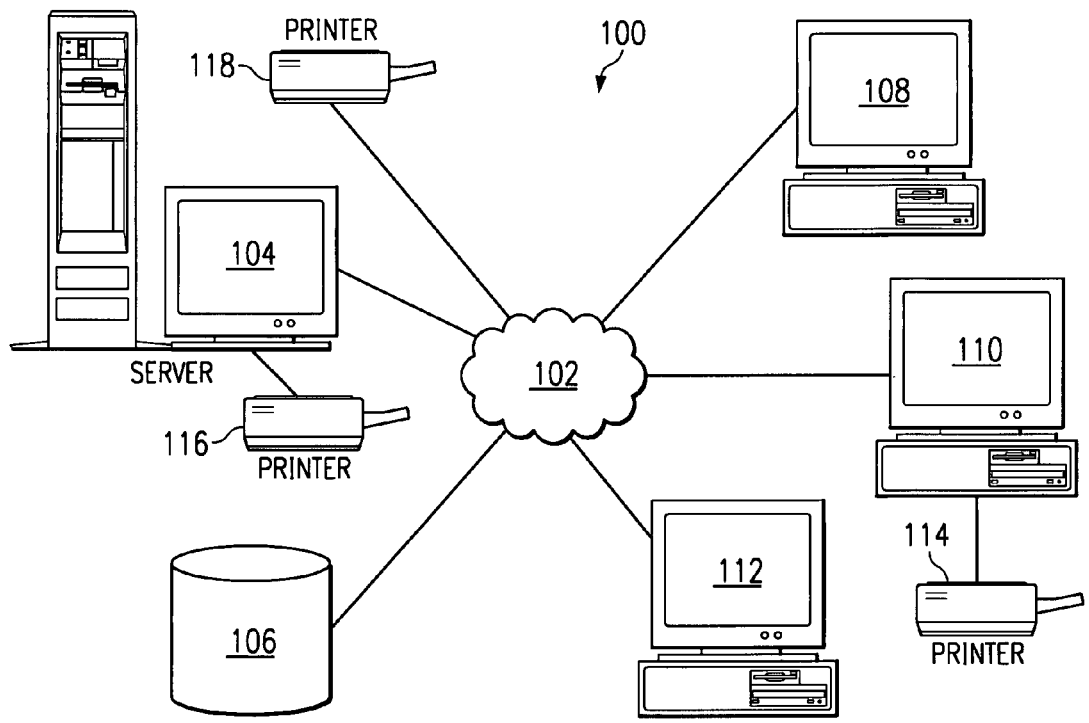
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. Distributed data processing system 100 also includes printers 114, 116, and 118. A client, such as client 110 may print directly to printer 114. Clients, such as client 108 and client 112 do not have directly attached printers. These clients may print to printer 116, which is attached to server 104 or to printer 118, which is a network printer that does not require connection to a computer for printing documents. Client 110 alternatively may print to printer 116 or printer 118 depending on the printer type and the document requirements.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
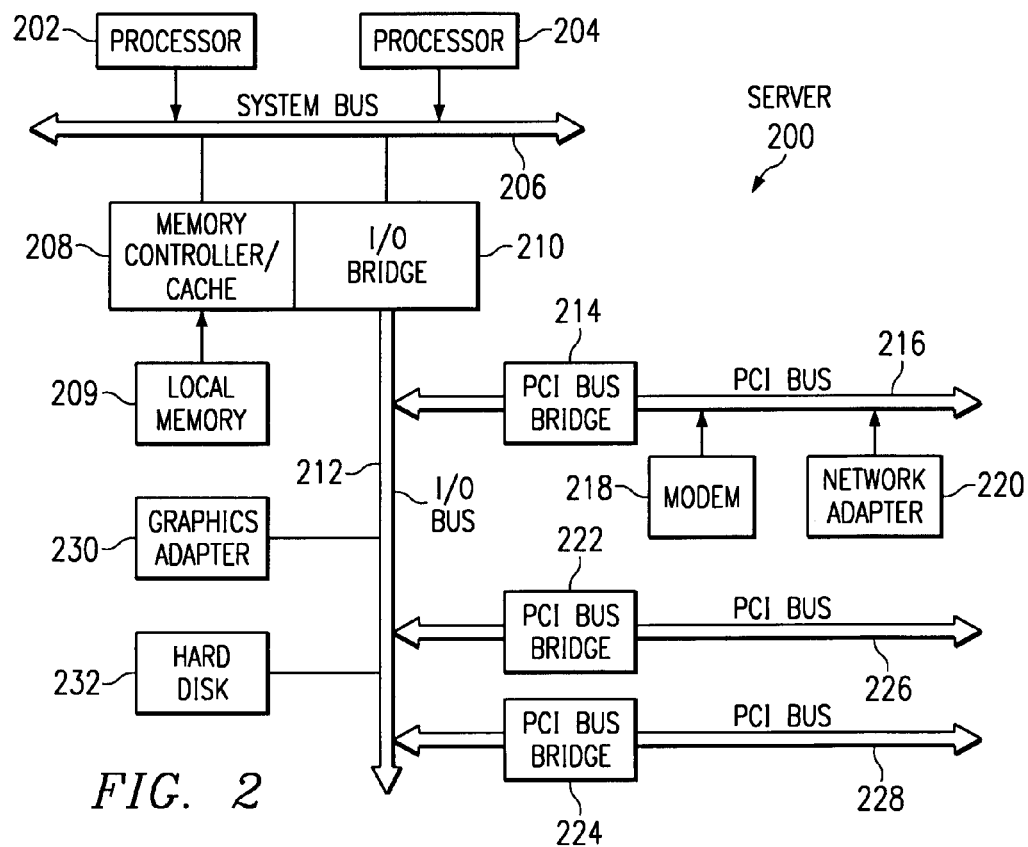
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
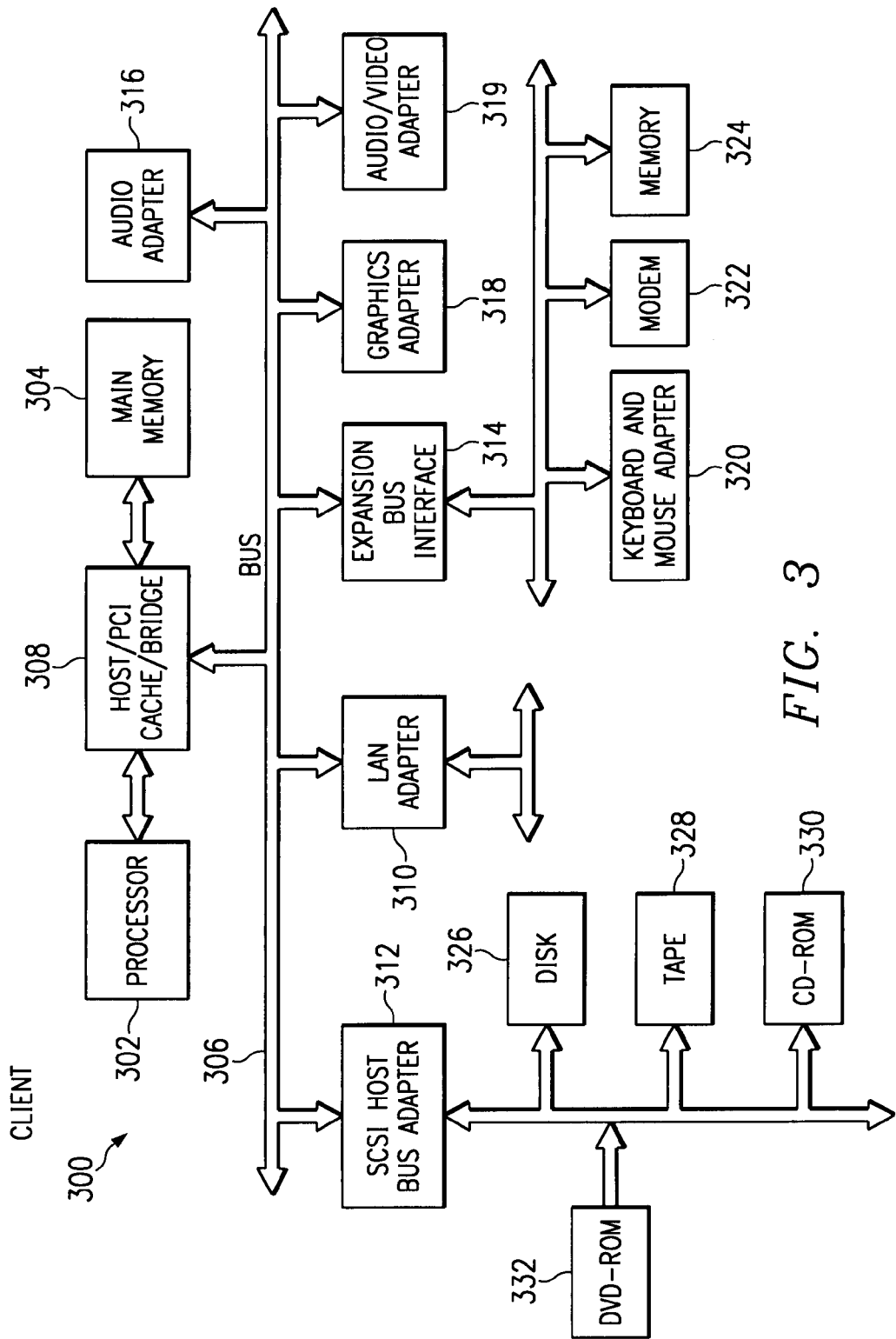
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

The present invention provides a method, apparatus, and instructions for providing backup font support for missing glyphs. A mechanism is provided in which a device driver, such as, for example, a printer driver or video driver, informs a graphic sub-system to provide a backup font when the device driver is asked to output a character or glyph that is not located within the font supported by the device driver. In such an instance, the device driver calls back to the graphics drawing sub-system to draw the character or glyph. Furthermore, high performance characteristics of various fonts, such as printer fonts are available for the majority of the output while also providing support for characters that the device driver does not have the character definitions to draw. In this manner, device fonts are only turned off or not used when certain or selected glyphs unsupported by the device driver are encountered rather than drawing them completely using the graphic sub-system as presently performed.

Figure 4:
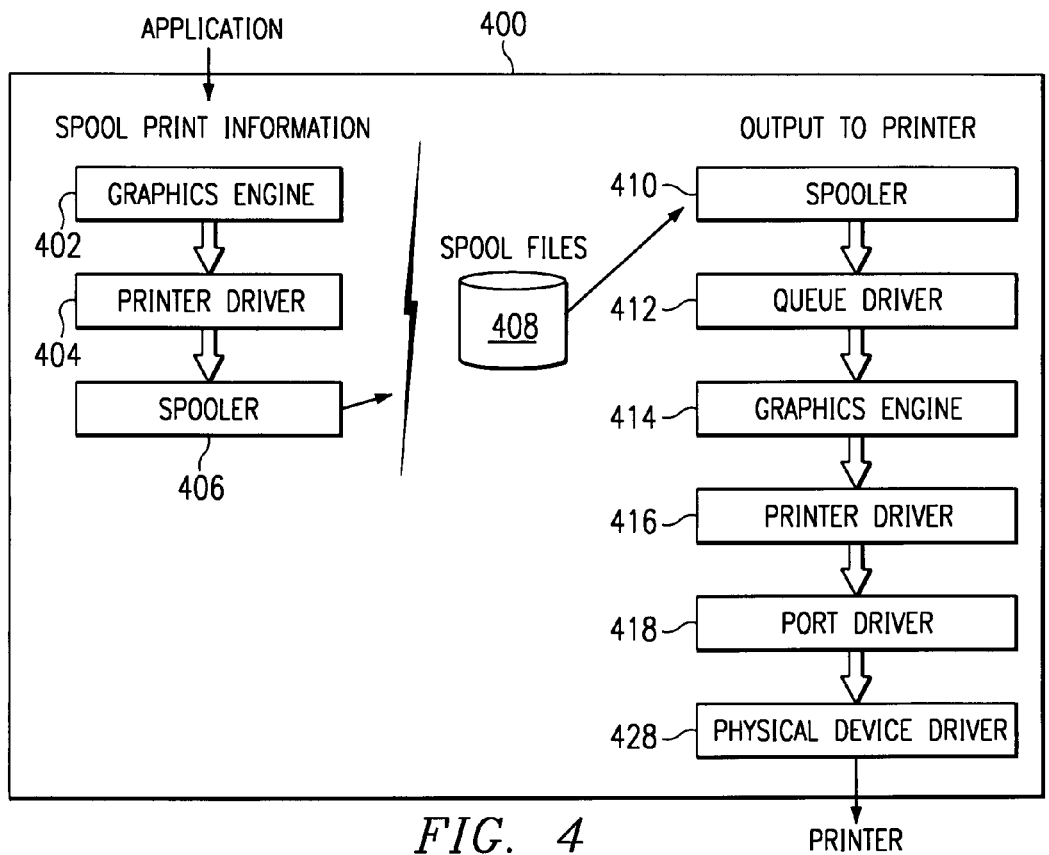
FIG. 4 is a block diagram illustrating a typical print system in accordance with a preferred embodiment of the present invention.

Turning now to FIG. 4, a block diagram illustrating a print system is depicted in accordance with a preferred embodiment of the present invention. Print system 400 performs the spooling and creation of a printer specific data stream on behalf of the application submitting the print request. In the depicted example, the printing process in print system 400 is divided into two phases, spooling or queuing of the print data and de-spooling or sending the data to the output device. The actual creation of the printer specific data stream may be performed during the spooling phase, or in some configurations when a metafile is used as a spool file the printer specific data stream connectivity, and server functionality, both phases of the print process may be done on a single system or the first phase may be done on a client, such as client 110 in FIG. 1, and the second phase may be done on a server, such as server 104 in FIG. 1.

A graphics engine 402 is a component or is employed with a combination of components to produce similar functionality for print system 400. Graphics engine 402 is responsible for mapping or converting the application interface calls or graphics API calls to the printer device interfaces. In the spooling phase, printer driver 404 is responsible for creating the printer specific data that is sent to the printer to produce the desired output. Printer driver 404 identifies unsupported characters and calls back to graphics engine 402 for simulation of characters or glyphs. For example, if a string of several characters is sent to printer driver 404 and the substring of several different characters is unsupported, printer driver 404 calls back to graphics engine 400 to simulate these characters at which time, graphics engine 402 associates another font with the device font. In many instances, this component provides configurable settings and returns information about the device. In some systems, this component is called a formatter since it formats the data appropriately for the printer. In other systems, this component is called a transform since it transforms the operating system calls or input stream to the data stream appropriate for the printer.

Next, spooler 406 is a component in print system 400 that stores and retrieves the print jobs as spool files 408, using a queuing algorithm to coordinate access to the printer.

In the de-spooling phase, spooler 410 retrieves print jobs from spool files 408. The data is later printed when queue driver 412 is available. Queue driver 412 is used to pre-format the spool data from spool files 408 before sending the data to the printer driver installed for the device. In most cases, this component, queue driver 412, is handling the case where a metafile has been spooled to spool files 408 and the metafile must be played back to the underlying print components by calling operating system components that parse the metafile and convert the metafile back to graphics calls that can be passed to the graphics engine. In other instances where printer specific data has been spooled, queue driver 412 simply passes the raw data to the underlying components of the print system.

Graphics engine 414 is then employed from queue driver 412 for converting the specific raw data or graphics to printer driver 416. Printer driver 416 is then responsible for creating the printer specific data to produce the desired output. Some printing systems separate the logic of how to communicate or send data to the printer device into a port driver 418, which is responsible for handling the device driver interface to the printer. Physical device driver 420 is a component responsible for the hardware protocols, such as, for example, hardware interrupts, and supporting a set of input and output functions used to communicate with or transmit data to the printer.

When the spooling and de-spooling phases are performed on the same computer, graphics engine 402 is the same graphics engine as graphics engine 414. Also, printer driver 404 and spooler 406 correspond to printer driver 416 and spooler 410. These components are different when the de-spooling or the actual printing of a print job from spool files 408 is performed at a different computer than the one in which an application generates a print job.

Printer driver 416 includes device fonts, which are fonts owned and handled by the device or device driver associated with the device. System fonts are fonts that are owned and handled by the operating system. When printer driver 404 or 416 encounters a glyph that is missing, the device driver indicates to the operating system that a backup font is required. Device driver calls back to the operating system with the glyphs to be provided by the operating system. In the depicted example, the back up font is a system font provided by the operating system. The processes for selecting and automatically using a backup font to provide missing glyphs is described in more detail below. The printer driver that makes the callback is the printer driver that is converting meta data format to printer specific format.

Figure 5:
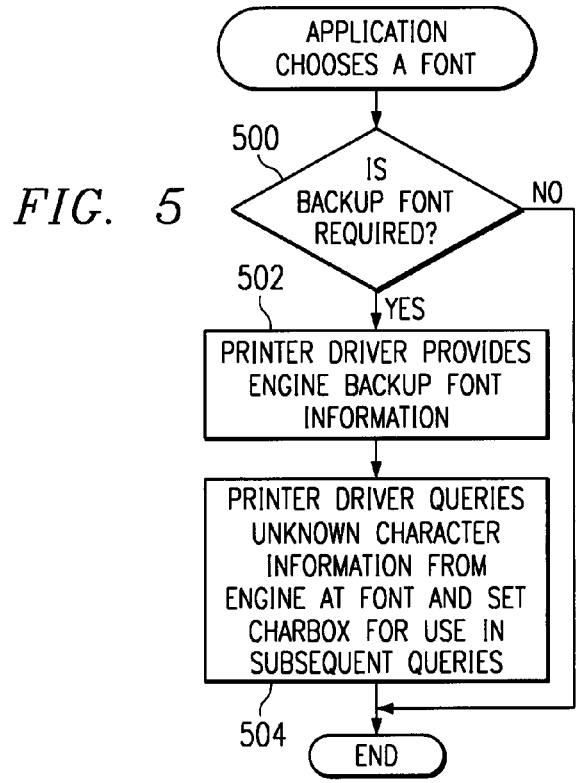
FIG. 5 is a flowchart of a process of an application selecting a backup font in accordance with a preferred embodiment of the present invention.

Referring next to FIG. 5, a flowchart of a process of an application selecting a backup font is depicted in accordance with a preferred embodiment of the present invention. In the depicted example, the backup font is a system font that is employed to supply missing glyphs encountered in a device font during the printing process.

This process is initiated when an application chooses a font. The process begins by the printer driver determining whether a backup font is required based on the possible inability to print a glyph using the printer driver font (step 500). In the depicted example, this font is a device font. If any glyph in the range of glyphs is not supported by this font, the printer driver indicates to the operating system that a backup font is required. Next, the printer driver provides the system information about the backup font so that the operating system can select the appropriate backup font (step 502). Information provided to the graphic sub-system in the operating system may include, for example, font name and font metrics, which are more precise characteristics of the font used for font selection. Other information provided to the operating system may include the desired range of glyphs that the backup font will be required to supply. The printer driver then queries unknown character information, such as, character widths, from the graphics engine and builds a set of information about the backup font by combining information from the device font and the backup font (step 504) with the process terminating thereafter. For speed, the driver for the device or system component which may be responding to queries about the font or glyphs within the font may build a single set of information about the font by combining information from the device font and backup font. This set of information may be created, for example, for each particular job or for a particular application. With respect to creating a set of information for a particular application, the data structure containing the application may be persistent based on whether the application is active. With reference again to step 500, if a backup font is not required, the process then terminates.

Figure 6:
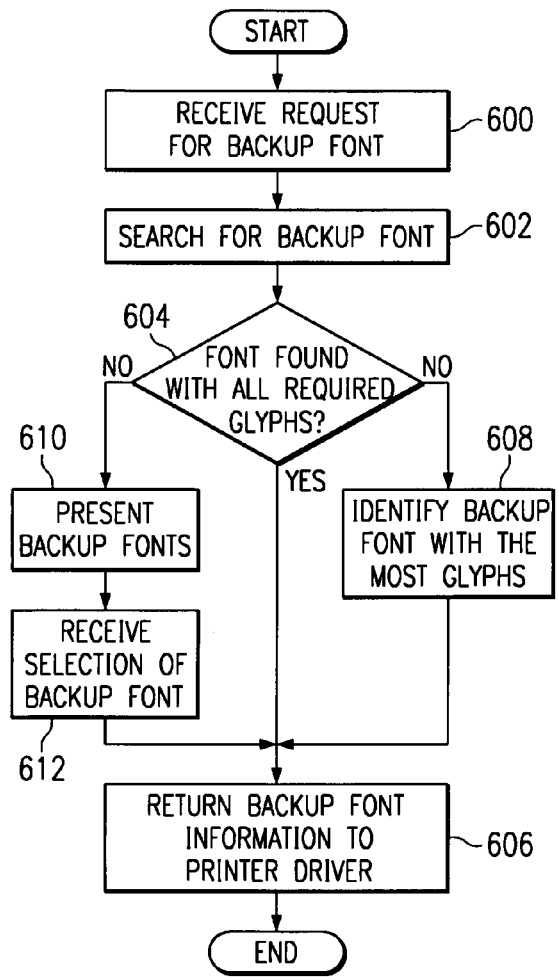
FIG. 6 is a flowchart of a process for selecting a backup font in accordance with a preferred embodiment of the present invention.

Turning next to FIG. 6, a flowchart of a process used by the operating system for selecting a backup font is depicted in accordance with a preferred embodiment of the present invention. In the depicted example, the process in FIG. 6 is implemented by the operating system to select an appropriate system font. The process begins by receiving a request for selection of a backup font (step 600). This request includes backup font information from the printer driver. This information will describe the font or characteristics of the font required to print glyphs not supported by the device font. The operating system then performs a search for the appropriate backup font (step 602). An appropriate backup font may be one that has more characters available than the device font. A determination is then made as to whether a backup font that is able to support all of the glyphs unsupported by the device font has been found (step 604). If such a font has been found, the process then returns backup font information to the printer driver (step 606) with the process terminating thereafter.

If a font containing all of the missing glyphs from the device font is not present, the backup font with the most glyphs is identified as the backup font for use by the printer driver (step 608). Optionally, the path through 610 and 612 may be taken instead. In such a case, backup fonts are presented for selection (610). In this manner, a user may select the backup font that contains glyphs most important for printing. Thereafter, a selection of the backup font is received (step 612) with the process then proceeding to step 606 as described above. Alternatively, in step 608 more than one backup font may be identified in which the multiple backup fonts support the entire range of glyphs missing from the device font.

Figure 7:
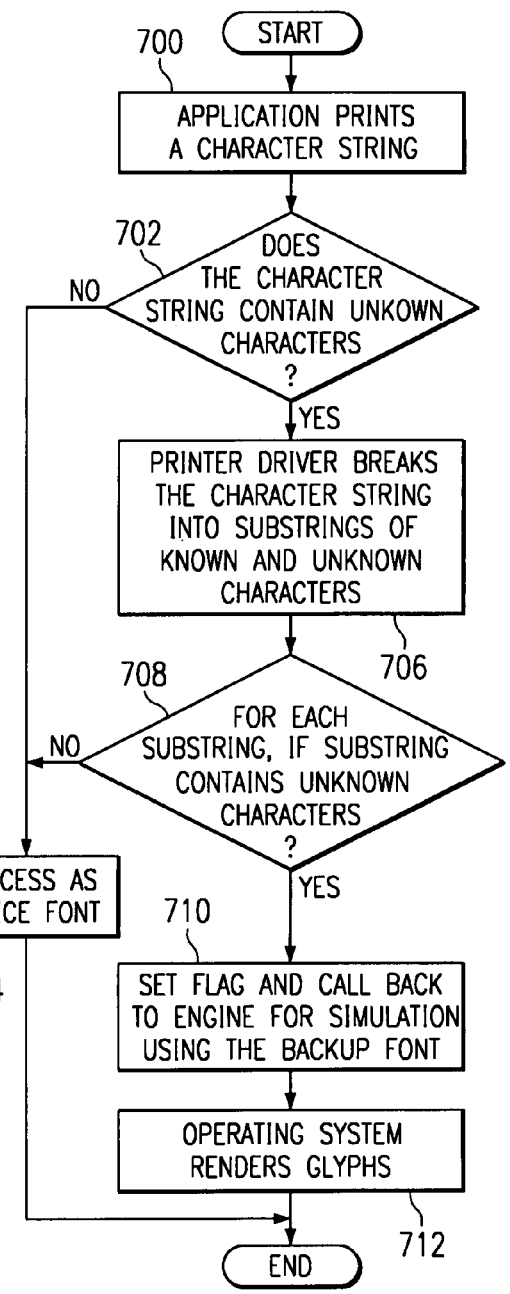
FIG. 7 is a flowchart of a process for the application printing a character string in accordance with a preferred embodiment of the present invention.

Turning now to FIG. 7, a flowchart of a process for the application printing a character string is depicted in accordance with a preferred embodiment of the present invention. The process begins by the application printing a character string to the printer driver (step 700). A determination is made as to whether the character string contains glyphs that are unavailable in the device font (step 702). If the character string does not contain any glyphs that can not be created by the device font, the character string is processed as a normal device font (step 704) with the process terminating thereafter.

If the character string does contain glyphs that are unavailable in the device font, the character string is then broken into substrings consisting of known and unknown characters or glyphs (step 706). Each substring is processed according to the contents of the substring. The boundaries of the substring are defined by the glyphs known and unknown to the printer driver. In other words, a substring will contain either all known glyphs or all unknown glyphs. Using these boundaries, the device driver can call back to the operating system only for the glyphs that are needed. A determination is made as to whether the substring contains unknown characters or glyphs (step 708). If the substring does consist of known characters or glyphs, the substring is processed as a normal device font string as described above in step 704. However, if the substring contains unknown characters or glyphs, the unknown characters or glyphs are processed using a backup font in which the printer driver sets a flag indicating to the operating system that the substring should be processed with the backup font (step 710). The operating system then utilizes the backup font and backup font information to render the glyphs with the process terminating thereafter (step 712). When the operating system is "rendering" the glyphs, a process of converting graphic drawings or font size and positioning calls to device specific data is employed. Alternatively, the printer driver may obtain the glyph information and use this information to print the glyphs thereafter.

Backup fonts are implemented in both the OS/2 Graphics Engine (GRE) and the individual printer drivers. The printer drivers are responsible for identifying the system font to be used for backup and for notifying the GRE when this backup font is to be used instead of the device font.

When the GRE calls the printer driver to realize, or instantiate, a device font, the printer driver's response includes a pointer to the facename of the system font to be used for backup purposes. The facename is the name of the system font. When text output and query calls are made to the GRE by the printer driver, the COM NODEVICE flag is used to indicate that all glyphs are to be taken from the backup font instead of the device font. Because all of the glyphs within a substring must be taken from one font or the other, the printer driver is responsible for converting all text strings into a collection of substrings composed entirely of either glyphs from the device font or glyphs from the backup font, not both.

Whenever the GRE receives a text call with the COM NODEVICE flag set, it verifies that a backup font has been defined for this device font. If the backup font exists, the GRE calls itself recursively to process the call using the backup font as the current font.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted embodiment is directed towards a device driver that is in the form of a printer driver for printing various characters and glyphs to a printer, the present invention may be employed to provide support for missing glyphs for other types of output devices, such as a display device. In addition, although the depicted example illustrates processes of the present invention implemented in a device driver, the processes of the present invention may be implemented in other components called by the device driver. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for printing comprising:
   receiving a file for printing at a printer driver in a computer system, wherein the file includes characters to be printed using a selected font; and
   responsive to a determination that a specific character in the file is absent from the selected font, printing the specific character using a backup font containing the specific character;
   wherein the computer includes an operating system and wherein the printing step includes:
     calling the operating system for the backup font;
     downloading the specific character contained in the backup font to the printer driver; and
     printing the specific character in the backup font, while printing other characters using the selected font.

2. A method in a computer system for printing comprising:
   receiving a file for printing at a printer driver in a computer system, wherein the file includes characters to be printed using a selected font; and
   responsive to a determination that a specific character in the file is absent from the selected font, printing the specific character using a backup font containing the specific character, while printing other characters in the file using the selected font;
   wherein the specific character is accessed by a call to the operating system.

3. A computer system for printing comprising:
   receiving means for receiving a file for printing at a printer driver in a computer system, wherein the file includes characters to be printed using a selected font; and
   responsive to a determination that a specific character in the file is absent from the selected font, printing means for printing the specific character using a backup font containing the specific character;
   wherein the computer includes an operating system and wherein the printing means includes:
     calling means for calling the operating system for the backup font;
     downloading means for downloading the specific character contained in the backup font to the printer driver; and
     printing means for printing the specific character in the backup font, while printing other characters using the selected font.

4. A computer program product, in a non-transitory computer readable medium, for printing in a computer system, the computer program product comprising:

instructions for receiving a file for printing at a printer driver in a computer system, wherein the file includes characters to be printed using a selected font; and responsive to a determination that a specific character in the file is absent from the selected font, instructions for printing the specific character using a backup font containing the specific character, while printing other characters in the file using the selected font; and wherein the computer includes an operating system and wherein the printing instructions further include:

instructions for calling the operating system for the backup font;

instructions for downloading the specific character contained in the backup font to the printer driver; and instructions for printing the specific character in the backup font, while printing other characters using the selected font.

5. A computer program product, in a non-transitory computer readable medium, for printing in a computer system, the computer program product comprising:

instructions for receiving a file for printing at a printer driver in a computer system, wherein the file includes characters to be printed using a selected font; and responsive to a determination that a specific character in the file is absent from the selected font, instructions for printing the specific character using a backup font containing the specific character, while printing other characters in the file using the selected font, wherein the specific character is accessed by a call to the operating system.

\* \* \* \* \*